Jan. 6, 1953 W. O. LYTLE 2,624,823
ELECTROCONDUCTIVE ARTICLE
Filed June 23, 1949

Inventor
WILLIAM O. LYTLE
By
Olen E. Bee
Attorney

Patented Jan. 6, 1953

2,624,823

UNITED STATES PATENT OFFICE 2,624,823

ELECTROCONDUCTIVE ARTICLE

William O. Lytle, New Kensington, Pa., assignor to Pittsburgh Plate Glass Company, a corporation of Pennsylvania Application June 23, 1949, Serial No. 100,961

11 Claims. (Cl. 201—73)

This invention relates to improved ceramic or refractory bodies, such as windshields, which are provided with a transparent electroconductive coating or film. It particularly relates to such articles having improved bus bars and to methods of applying bus bars to such articles.

It is known that transparent electroconductive films may be deposited upon glass by applying stannic chloride to the surface of glass heated above 400° F., preferably 850 to 1350° F. Films of superior conductivity may be produced according to methods described in applications for United States Letters Patent, Serial No. 762,658 and Serial No. 762,659, both filed July 22, 1947, by William O. Lytle. These films or coatings are obtained by spraying plate, window or other glass while it is heated to a temperature above 400° F. but below the temperature at which the glass becomes molten, with tin tetrachloride or other tin salts in aqueous solution or in vapor state, in the presence of a reducing agent such as methanol, phenyl hydrazine hydrochloride, or other agents. These films thus obtained are of unknown composition, but appear to contain a preponderant amount, of the order of 97 to 99 percent, of a tin oxide and certain impurities which may include metallic tin, carbon, silicon, sodium and chlorine and other impurities, depending upon the composition of the applied tin containing solution. These films have a thickness of about 50 to 800 millimicrons, are transparent and have the unusual characteristic of being electroconductive, the particular degree of electroconductivity being dependent, to a large degree, upon the nature of the process of depositing the films. Tin oxide films, which are deposited in accordance with the processes described and claimed in the aforesaid applications of William O. Lytle, incorporation of the disclosure of which is made a part hereof by reference, have a resistance below about 500 ohms per unit square, a specific resistance below about 0.002 ohm centimeters, and a haze factor below about 2.5 percent.

Although articles having such films are useful in many fields, they have been found to be especially useful as windshields or viewing closures in automobiles, aircraft, trains, and similar automotive vehicles. In such use the coating is placed in series with a source of electric potential and is used as a heating element in order to heat the closure and prevent deposition of ice, fog, etc. thereupon.

As disclosed in the Lytle applications, a glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. To be capable of withstanding the temperatures and oxidizing conditions of treatment, it has been required that these bus bars be of ceramic character and be capable of glazing or otherwise forming an adherent, well bonded coating to the glass. The strips should adhere firmly to the glass sheet, and should have a conductivity at least 10 to 20 times that of the conductive coating. Generally, the strips are from about 0.1 to 1 inch in width.

Prior to this invention, it has been found that the most satisfactory compositions, for use in preparing the bus bars, comprise a highly conductive metal powder (preferably gold or silver) and a vitrifying binder.

After application of the metal bus bars to the glass sheet by screening, painting, or other method, the sheet has been heated to the temperature at which application of the conductive coating may be effected, for example, above about 400 to 800° F. but below the fusion point of the glass, usually 950 to 1350° F. During this heating operation, the ceramic metal coating becomes glazed and is fused onto the glass.

When the glass has been heated as above described, for one or two minutes, it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period, usually of the order of 2 to 20 seconds, depending upon the thickness of the film to be produced, the air pressure imposed upon the atomizing spray gun, etc. Usually this spraying operation is conducted in air of atmospheric humidity or oxygen. However, conductive coatings have been obtained even when oxygen appears to be essentially absent, although it is believed that oxygen combined in water or similar compound, is essential to the operation. This process results in the production of a base coated with a tin oxide electroconductive film.

Difficulty is encountered in achieving satisfactory adhesion between the glass base and the bus bars and at the same time achieving satisfactory electrical contact between the bus bars and the electroconductive film. If the bus bar is deposited after a coating of the conducting oxide has been applied, only metallizing compositions which dry or cure in air or at low temperatures can be used. Such compositions adhere too poorly and are too readily scraped off in subsequent handling to be satisfactory for most purposes. On the other hand, application of a fused or glazed ceramic metallic coating requires baking at temperatures which impair the electrical conductivity of the oxide film.

Furthermore, because of certain characteristics of metal oxide films, such as a tin oxide film, certain problems arise in establishing electrical contact between the bus bars and the film. For example, when a silver ceramic bus bar is applied to a refractory base and a tin oxide coating thereafter applied in the manner above described, the silver bus bar has a certain repulsion for the tin coating and little or no tin oxide tends to deposit immediately adjacent the bus bar. Hence good contact and bonding between the bus bar and the film or coating is not obtained.

In accordance with this invention, a refractory base, preferably transparent such as glass, having bus bars which adhere more firmly to the base than those now in use, and an electroconductive film which is in excellent electrical contact with said bus bars is produced. It is found that such a base may be produced if an intermediate, adherent layer comprising a ceramic enamel binder and pulverulent granular abrasive and/or refractory particles is applied and bonded to the base before application of the bus bars, preferably before application of the transparent electroconductive film. Such a layer provides a rough base to which the film and bus bars may more firmly adhere and failure due to peeling is greatly minimized.

Applicant's invention is illustrated by the accompanying drawing in which.

Figure 1:
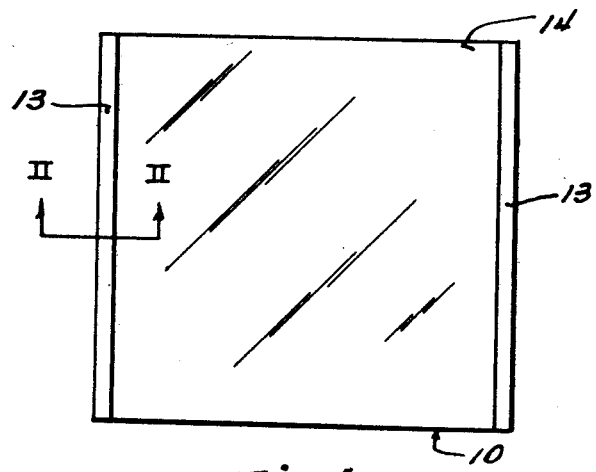
Fig. 1 is a diagrammatic plan view of a rectangularly shaped heating panel.

In the drawing a heating panel 10 is shown. The heating panel is comprised of a glass sheet 12 having thereon a pair of laterally spaced electroconductive bus bars 13 and a transparent electroconductive tin oxide coating 14, said bus bars 13 being bonded to the glass sheet by a rough intermediate layer 16 comprising a vitrifying enamel binder containing pulverulent granular particles 17 of a fused aluminum oxide or the like. The bus bars may be connected to opposite poles of a source of potential (not shown).

Figure 2:
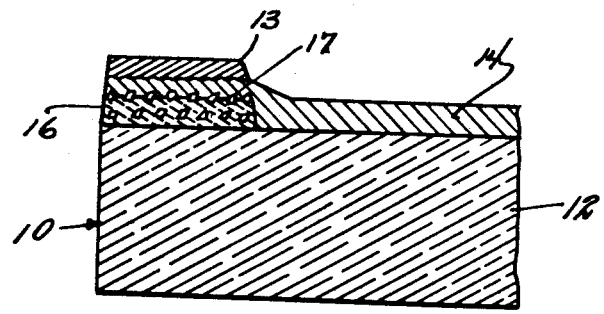
Fig. 2 is an enlarged diagrammatic partial sectional view taken along the lines II—II of Fig. 1, illustrating one embodiment of the invention.
Figure 3:
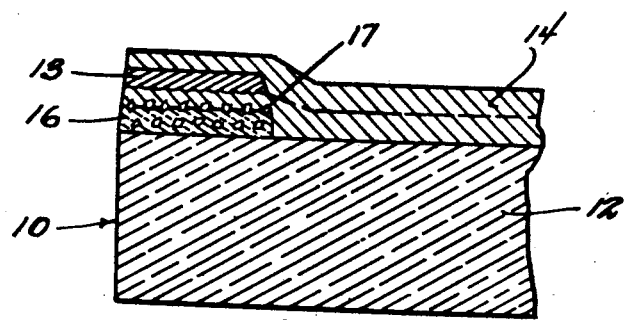
Fig. 3 is an enlarged diagrammatic partial sectional view similar to Fig. 2 illustrating a further embodiment of the invention.

Figs. 1 and 2 illustrate the invention where only one layer of the electroconductive film 14 is applied, whereas Fig. 3 illustrates a further embodiment wherein two or more layers of the electroconductive film are applied. When two or more electroconductive layers are applied, the second and succeeding layers may be applied after the metal bus bars are affixed. This results in the production of a heating panel as shown in Fig. 3.

For purposes of illustrating the invention more clearly, certain of the elements of the heating panel 10 have been exaggerated with respect to their size relative to the other elements. The roughened surface of the intermediate layer 16 actually will not present such pronounced projections, but rather will present many small projections. The size of the refractory particles 17 has likewise been enlarged to show their contribution in creating the roughened surface.

Also, it has been pointed out that the electroconductive film 14 when placed over the intermediate layer 16 does not tend to lessen the effect of the rough surface of the intermediate layer in its action as base for the bus bar. Thus the film does not fill in the depressions in the intermediate layer but merely coats the surface thereof in the same manner as it coats the surface of the glass sheet 12.

Generally the film is affixed after the intermediate layer is applied and the metallic bus bars deposited after the film. When the metallic bus bars are applied after the film, an excellent electrical contact is obtained between them, and the aforementioned problem of repulsion or rejection of the film by the metal bus bars is not encountered. Also, when the metallic bus bars are applied after the film, the need for an electroconductive ceramic bus bar composition is no longer present. This eliminates a heating operation which would be damaging to the film. The metal bus bars may be deposited in the form of a metal paint or paste such as an air drying cement comprising a conductive metal powder such as silver, copper, gold, etc. and an air drying binder (linseed oil, air curing resins, etc.) or a curing type binder, for example, thermosetting resins. Other means of depositing the reinforcing layer of copper, silver or other conductive metal may be employed such as by electrodeposition, cathode sputtering, dipping, spraying with a Schori or a Schoop type metallizing gun, etc.

The intermediate layer comprising the ceramic enamel binder and the refractory particles is applied to the base by painting, screening, or other suitable method, and the base is heated to a temperature at which the binder fuses to the base. This temperature is below the fusion temperature of the base, but high enough to cause fusion of the binder to the base. If the base is glass, temperatures above 400 to 800° F. but below 950 to 1350° F. are employed. The film and bus bars may thereafter be affixed as described above. The thickness of the film is not sufficient to harm or render any less effective the use of the roughened surface of the intermediate layer as a base for the bus bars. The intermediate layer may also be applied by applying the binder to the base at or near room temperature and then, while the binder is still tacky, spraying, dusting or otherwise affixing a layer of the refractory particles to the surface of the binder. The thickness of the intermediate layer is preferably about 0.0005 inch and may range from 0.00025 to 0.002 or 0.003 inch.

The particles providing the roughened surface should be capable of withstanding high temperatures, for example temperatures up to about 900–1500° F., in order that the temperature conditions encountered in applying the bus bars and electroconductive film will not melt or decompose them, or otherwise destroy their usefulness. Particles found to be especially suitable in the practice of the invention are pulverulent granular particles of compounds generally classified as abrasives and/or refractories. These include natural compounds such as diamonds, corundum, emery, garnet, quartz, kieselguhr, rouge, diatomaceous earth, almandite, adamantine, mica, pumice, etc., and synthetic compounds such as silicon carbide, boron carbide, tungsten carbide, lime soda glass, borosilicate glass, phosphate glass, china, fused aluminum oxides and oxides of chromium, magnesium, silicon and zirconium. For best results, it is desirable that the size of the particles be between 50 to 700 mesh.

The abrasive particles are applied to the base by use of a binder which is capable of establishing adhesion to the glass base and the electroconductive coating, and which is also capable of resisting heat and decomposition at temperatures up to about 900–1500° F. For most purposes, it is found desirable to utilize a vitrifying flux or binder which is capable of forming a glass or glass-like product upon fusion or heating to high temperature. Thus, aqueous suspensions or dispersions of hydrated colloidal silica, sodium silicate or other alkali metal silicate, or alkali metal or beryllium metaphosphates or metaborates, boron oxides, borosilicate forming compositions including lead borosilicate compositions, etc. are suitable for this purpose. Various other vitrifying glass forming adhesive compositions which are capable of withstanding heating to 1500° F. also are capable of use.

A roughened surface may also be provided by applying a coating of the binder by itself to the refractory base. This may be done by applying a rough glazing enamel, that is, an enamel which doesn't fire to a smooth surface, such as an enamel composition comprising:

| | Parts by weight, per cent |
|---|---|
| Sodium carbonate | 19 |
| Boric acid | 28 |
| Silica | 53 |

This rough surface may also be attained by applying a ceramic enamel to the base at a temperature just below that at which the enamel fuses and becomes a glass-like solid, but at a temperature sufficient to bond the enamel to the base. This results in producing a porous enamel coating which presents a rough surface to which the electroconductive film and bus bars may more firmly adhere.

The ratio of binder to the granular particles may be in any proportion adapted to provide a rough surfaced coating. Compositions having up to 80 percent by weight of the granular particles have been found to be particularly satisfactory. Listed below are several typical compositions:

| | Parts by weight |
|---|---|
| 1. Alundum | 20 |
| Sodium carbonate | 19.3 |
| Boric acid | 28.1 |
| Silica | 32.6 |
| 2. Alundum | 20 |
| Litharge | 18 |
| Boric acid | 2 |
| Silica | 2 |
| 3. Alundum | 25 |
| Litharge | 14 |
| Silica | 2 |
| Boric acid | 2 |
| 4. Alundum | 20 |
| Lead borate | 30 |

The preferred method of preparing the compositions for application is to heat the ingredients forming the ceramic enamel binder, for example, litharge, boric acid, and silica, to a sufficient temperature, for example 1700° F., to compel them to fuse and form a glass-like mass. This mass is then converted into a frit by grinding, usually in a ball mill. The abrasive particles, for example alundum, are then added to this frit and spraying or screening vehicles are added to the compositions to facilitate their application. Some of the vehicles usually employed are French fat oil, turpentine, water, ethyl alcohol, etc.

If two or more electroconductive oxide coatings are to be applied, the bus bars are even more advantageously applied after at least one of the coatings has been applied but before application of the last coating. For example, first the surface of the base is provided with the intermediate layer, then at least one tin oxide film is deposited, the bus bars are applied, and a final tin oxide film is deposited. It is understood, of course, that the above procedures are merely preferred procedures and not intended as limitations on the practice of the invention. Other procedures wherein the number of coats, order of the application of the coats, etc. may be varied are merely to be taken as further embodiments of this invention.

The invention is particularly applicable for use in connection with transparent tin oxide films. However, the invention is also applicable in connection with other transparent electroconductive films, particularly metal oxide films. Thus the films herein contemplated may comprise cadmium oxide, zinc oxide, indium oxide, titanium oxide, thallium oxide, etc. which may be prepared by using the bromide, chloride or acetate of the corresponding metal. Transparent metal films normally have poor light transmission but are suitable where this property is not seriously objectionable.

Where viewing closures for vehicles are to be provided, the base for the film normally is ordinary window or lime soda glass. Other refractory materials including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

I claim:

1. An article of manufacture which comprises a refractory base having thereon a pair of laterally spaced electroconductive bus bars and a transparent electroconductive metal oxide coating, said bus bars and metal oxide coating being bonded to the refractory base by a rough intermediate layer containing pulverulent granular refractory particles.

2. An article of manufacture which comprises a refractory base having thereon a pair of laterally spaced electroconductive bus bars and a transparent electroconductive metal oxide coating, said bus bars and metal oxide coating being bonded to the refractory base by a rough intermediate layer comprising a vitreous enamel binder containing pulverulent granular refractory particles.

3. An article of manufacture which comprises a refractory base having thereon a pair of laterally spaced electroconductive bus bars and a transparent electroconductive tin oxide coating, said bus bars and tin oxide coating being bonded to the refractory base by a rough intermediate layer comprising a vitrifying enamel binder containing pulverulent granular refractory particles.

4. An article of manufacture comprising a transparent glass base having thereon a pair of electroconductive, metal bus bars and a transparent electroconductive tin oxide film being in electrical contact with the bus bars and being bonded to the base by a rough intermediate layer comprising a vitrifying enamel binder containing pulverulent granular particles of a fused aluminum oxide.

5. An article of manufacture which comprises a refractory base having thereon a pair of laterally spaced electroconductive bus bars and a transparent electroconductive coating, said bus bars and electroconductive coating being bonded to the refractory base by a rough intermediate layer containing pulverulent granular refractory particles.

6. An article of manufacture which comprises a refractory base having a pair of laterally spaced rough strips comprising a vitreous enamel binder containing pulverulent granular refractory particles disposed on a face thereof, a transparent electroconductive metal oxide coating on the base and extending between and over the strips, and a pair of metallic electroconductive bus bars adherently bonded to the metal oxide coating in the area of the coated strips.

7. A method of producing an electroconductive article which comprises affixing a rough strip to a portion of the surface of a refractory base, the strip comprising a ceramic enamel binder containing pulverulent granular refractory particles, applying a transparent electroconductive metal oxide film to the base and rough strip, and thereafter applying a metal coating suitable for use as a bus bar to the metal oxide film in the area of the coated strip.

8. An article of manufacture which comprises a refractory base having a pair of laterally spaced rough strips comprising a vitreous enamel binder containing pulverulent granular non-metallic refractory particles disposed on a face thereof, a transparent electroconductive metal oxide coating on the base and extending between and over the strips, and a pair of metallic electroconductive bus bars adherently bonded to the metal oxide coating in the area of the rough strips.

9. An article of manufacture which comprises a refractory base having a pair of laterally spaced rough strips, the essential ingredient of which is a vitreous enamel binder, disposed on a face thereof, a transparent electroconductive metal oxide coating on the base and extending between and over the strips, and a pair of metallic electroconductive bus bars adherently bonded to the metal oxide coating in the area of the coated strips.

10. An article of manufacture which comprises a refractory base having a pair of laterally spaced rough strips of a porous enamel binder disposed on a face thereof, a transparent electroconductive metal oxide coating on the base and extending between and over the strips and a pair of metallic electroconductive bus bars adherently bonded to the metal oxide coating in the area of the coated strips.

11. An article of manufacture which comprises a refractory base having a pair of laterally spaced rough strips of a rough glazing enamel disposed on a face thereof, a transparent electroconductive metal oxide coating on the base and extending between and over the strips and a pair of metallic electroconductive bus bars adherently bonded to the metal oxide coating in the area of the coated strips.

WILLIAM O. LYTLE.

REFERENCES CITED

The following references are of record in the file of this patent:

UNITED STATES PATENTS

| Number | Name | Date |
| --- | --- | --- |
| 2,429,420 | McMaster | Oct. 21, 1947 |
| 2,475,379 | Strong | July 5, 1949 |